United States Patent

[11] 3,603,016

| [72] | Inventors | Hubert J. Ursich<br>2820 Ivy St., San Diego, Calif. 92104;<br>David J. Seymour, San Francisco, Calif. |
|---|---|---|
| [21] | Appl. No. | 867,190 |
| [22] | Filed | Oct. 17, 1969 |
| [45] | Patented | Sept. 7, 1971 |
| [73] | Assignee | said Ursich, by said Seymour |

[54] NET DRUM SYSTEM
2 Claims, 7 Drawing Figs.

| [52] | U.S. Cl. | 43/8 |
|---|---|---|
| [51] | Int. Cl. | A01k 73/12 |
| [50] | Field of Search | 43/8, 14; 254/137, 138 |

[56] References Cited
UNITED STATES PATENTS

| 3,112,575 | 12/1963 | Lewis et al. | 43/8 |
|---|---|---|---|
| 3,266,777 | 8/1966 | Vittone | 43/8 X |
| 3,469,819 | 9/1969 | Puretic | 43/8 X |
| 3,497,182 | 2/1970 | Puretic | 43/8 X |

Primary Examiner—Warner H. Camp
Attorney—Owen, Wickersham & Erickson

ABSTRACT: A net-laying and stowing system for oceangoing vessels having a hull with a deck and a stern having a smooth surface over which the net may enter into the water. A turntable on the deck near the stern enables motion of 180° from the stern toward the portside toward the bow and back again, and it carries a stowing and laying drum around which the net is wound, between a pair of end flanges. On the turntable is a pair of guides for individually engaging each edge of the net; the guides are movable across approximately half the net from each of the two edges, for spooling the net onto the drum, so that the weights, floats, and so on, are able to be located in such a way that the net is spooled around the drum in a cylinder rather than bulging at each end.

PATENTED SEP 7 1971
3,603,016
SHEET 1 OF 4
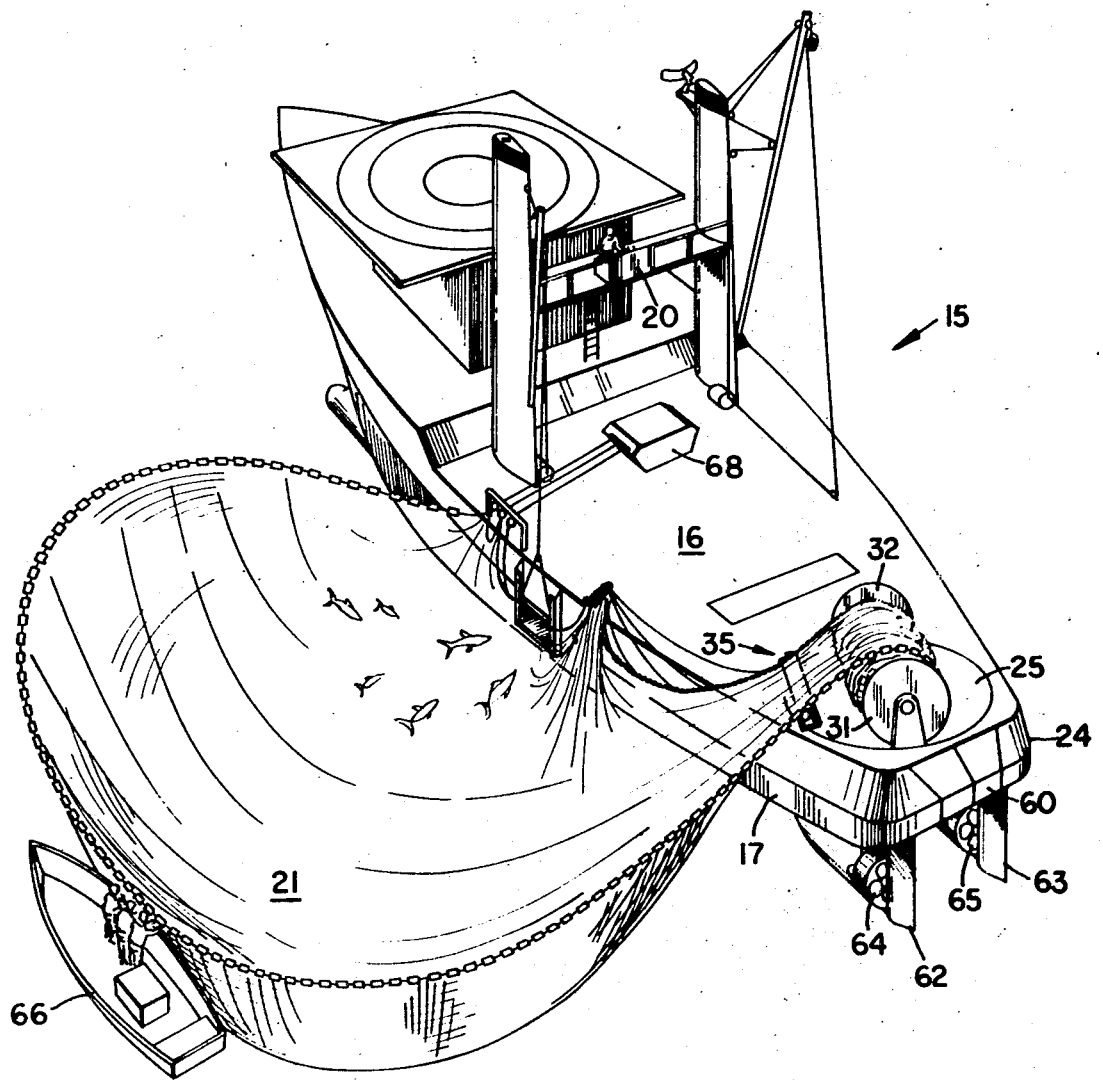
FIG_1
INVENTORS
HUBERT J. URSICH
DAVID J. SEYMOUR
BY
Owen, Wickersham & Erickson
ATTORNEYS

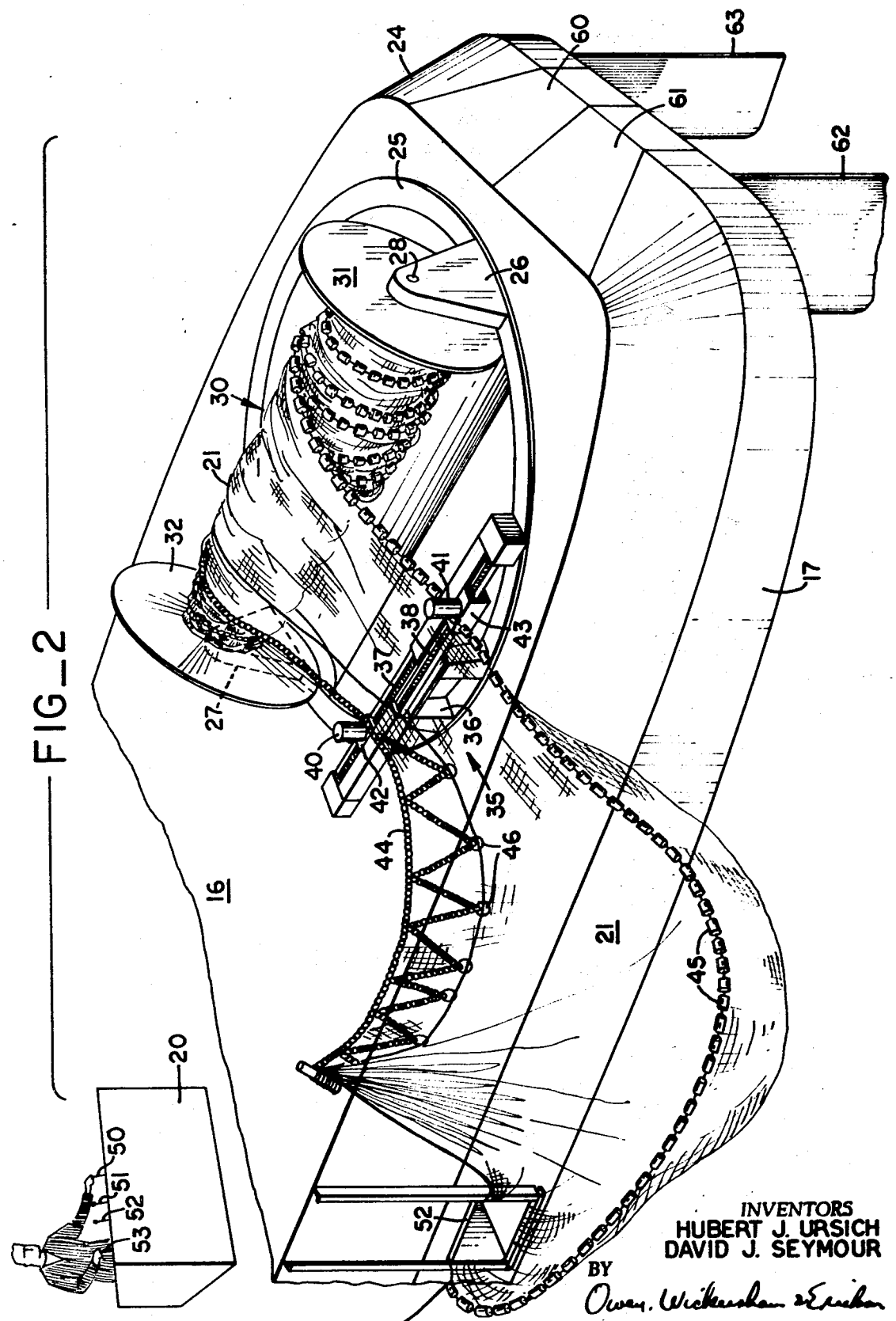

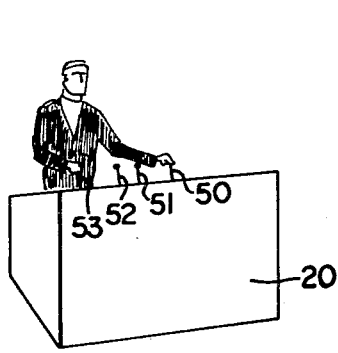
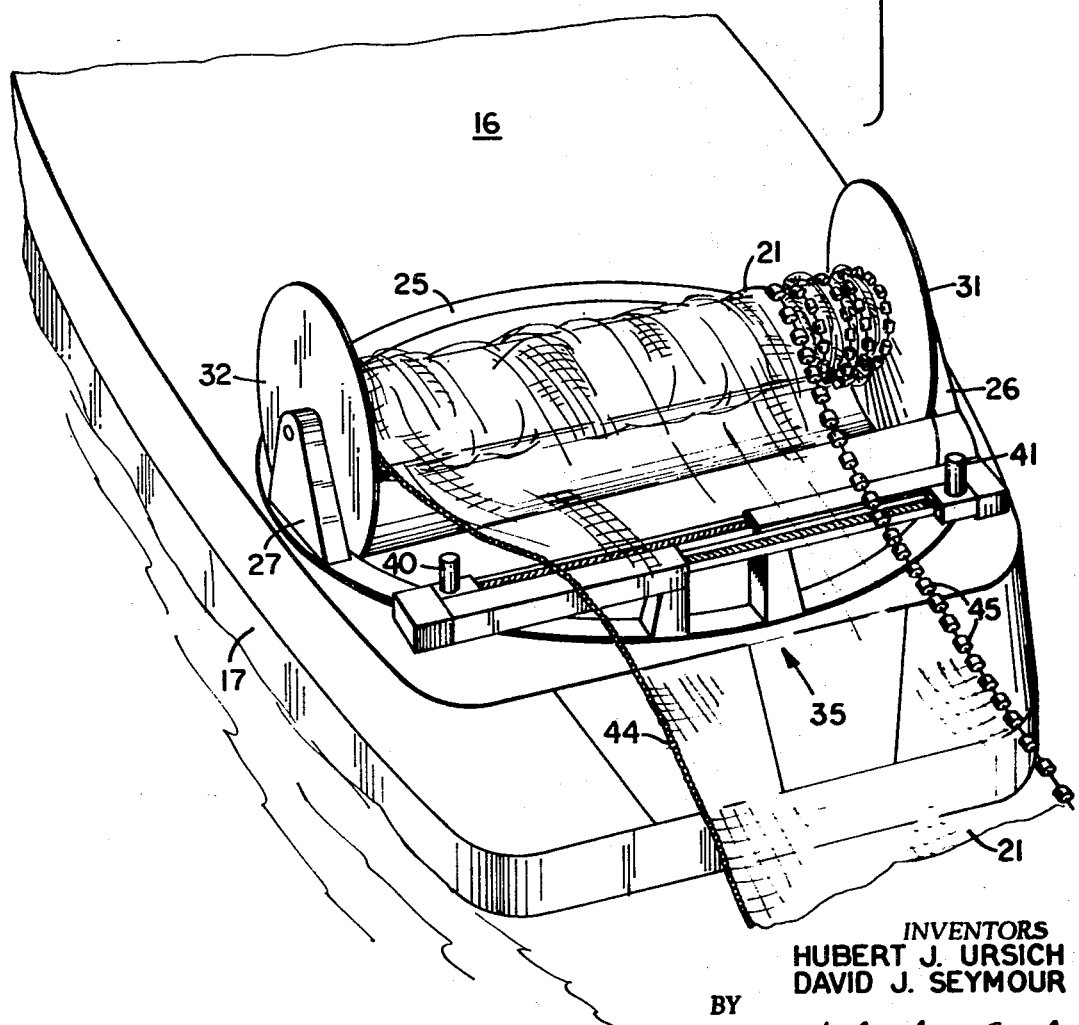
FIG_3

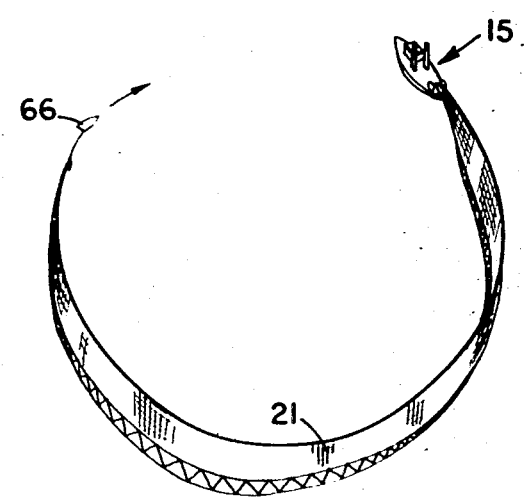
FIG_4
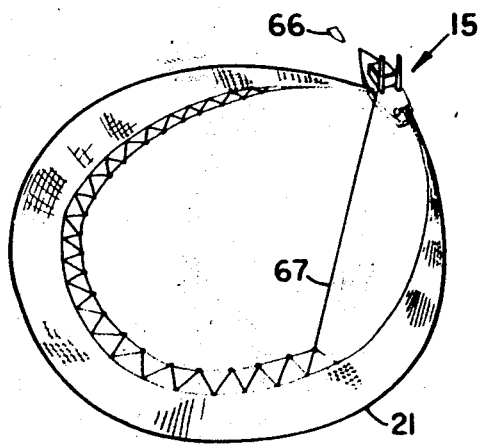
FIG_5
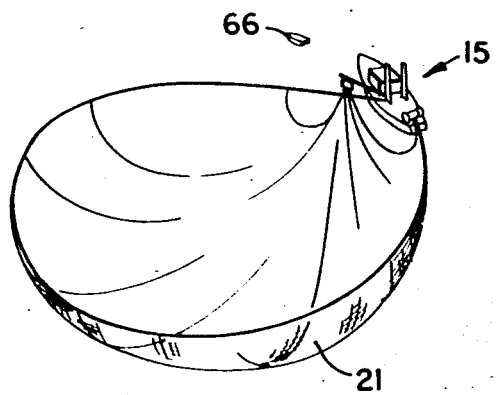
FIG_6
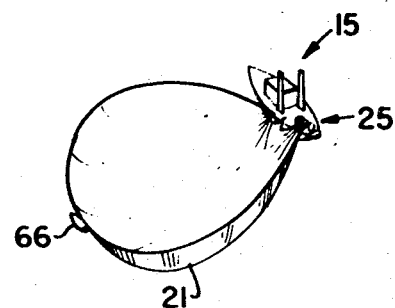
FIG_7

NET DRUM SYSTEM

This invention relates to oceanic fishing and particularly to the laying and stowing of large fishing nets.

Fishing nets have generally had to be handled mostly by hand, because at each they are far more bulky than they are in between edges. Thus, the upper edge of the net has floats on it to keep it approximately at the surface of the water, while the lower edge of the net has weights, causing it to sink and keeping the net in a vertical position, and possibly has purse seine rings or loops on it to enable pursing. When nets have been heretofore wound on drums, the operation has been inefficient because of the great bulging of the net on each side of the drum, the bulge on one side being due to the floats and on the other side to the weights and purse seine rings.

Also, the handling of nets has been difficult because where attempts have been made to use mechanical systems, whether including drums or not, the drums have not been conveniently mounted and have required expensive special additional equipment in conjunction therewith.

In the present invention, the net can be laid very rapidly from a drum around which it is wound, and, during stowing, a pair of spooling means are employed which lay the net in such a way that it does not bulge at the ends. Two spooling means are used, one relative to each side of the net, and they are controlled individually, so that the fact that the two edges may be of different bulk is taken into account. Visual control enables compensation for various uneveness that might otherwise occur.

The geometry and structure of the ship at the stern helps in laying the net, and the drum is mounted on a turntable capable of moving 180° to enable laying and stowing from convenient angles. Another important feature is means for protecting the net from the screws.

Other objects and advantages of the invention will appear from the following description of a preferred form.

In the drawings:

FIG. 1 is a view in perspective of a ship embodying the present invention with a net being spooled onto the drum. The drawing shows a ship like that shown in my copending application, Ser. No. 867,536 filed Oct. 20, 1969 although it is not necessary to the present invention.

FIG. 2 is an enlarged fragmentary view in perspective of the stern end of the ship, shown in conjunction with a control console, actually more distant from the stern than shown. The view shows a spooling and drum system embodying the principles of the invention, in its net-reeling-in position.

FIG. 3 is a fragmentary view in perspective of the stern end from a different viewpoint and showing the system in its net-letting-out position.

FIG. 3 is a somewhat diagrammatic view in perspective illustrating laying of the net, at a stage before the net-laying has been completed.

FIG. 5 is a similar view, showing the net completely laid and with pursing beginning.

FIG. 6 is a similar view showing the net pursed and with the net being tightened by stowing the rear end portion on the drum.

FIG. 7 is a similar view showing a later stage of the stowing of the net.

A ship 15 is shown having a deck 16, a hull 17, and a control console 20 for controlling the laying and stowing of a net 21.

Near the stern 24 of the ship 15 is a turntable 25 rotatably mounted on the deck 16, approximately level therewith, for movement over approximately 180°, motion preferably being as shown, so that the net 21 is stowed from the portside of the ship 15. A pair of support members 26 and 27 mounted on the turntable 25 carry a drum shaft 28, and the shaft 28 rotatably supports a drum 30. The drum 30 has a pair of flanges 31 and 32, one at each end. A central cylinder 33, secured to the flanges 31 and 32, is used as the core about which the net 21 is wound. Also mounted on the turntable for motion with the drum is a spooling assembly 35, which comprises a supporting frame 36, a pair of lead screws 37 and 38, and a pair of movable edged-contacting vertical rollers 40 and 41 mounted on an internally threaded support member 42 or 43. Rotation of the lead screw 37 or 38 causes motion transversely of the edge-contacting vertical rollers 40 or 41. During stowing of the net 21, the members 40 and 41 engage the edges 44 and 45 of the net 21 and, according to their positions, guide the edges 44 and 45 onto the drum 30.

The control console 20 is provided with a plurality of control members with one handle 50 for causing the edge member 40 to move toward the left side of the drum 30 or toward the right side, depending on the direction of movement of the handle 50. There is another control 51 for the other edge, member 41, having the same general effect. There are also a control handle 52 for causing the drum 30 to unwind or wind, and a handle 53 for rotating the position of the turntable 25 clockwise or counterclockwise.

The stern 24 itself is provided with an end wall 60 providing a rounded surface 61 over which the net 21 slides easily into the water. Also, a pair of guards 62 and 63 are provided, extending down just forward of this end wall 60 of the stern 24 to prevent the net 21 from getting entangled in the screw propellers 64 and 65. These guards 62 and 63 may simply be fins extending rearwardly and vertically along the center of each propeller 64, 65.

In operation during the laying of the net 21, one end of the net 21 is placed aboard a powered skiff 66, and then the ship 15 describes a large circle approximately the length of the net 21 (FIG. 4). As it does so, the net 21 is unwound from the drum 30, going right over the stern 24, over the surface 61 of the wall 60 during the entire passage. When the circle is completed as shown in FIG. 5, a purse line 67 may be tightened by a suitable winch 68 to bring the net 21 into its purse position shown in FIG. 6.

Then, the shortening of the net 21 begins, and this means beginning the stowage of the net 21 (FIG. 7). For this purpose, the turntable 25 is gradually moved from its fore-and-aft position of FIG. 3 toward the portside, and gradually toward the position shown in FIGS. 1 and 2. The net 21 is stowed by the man watching the controls 50 through 53, who also at the same time watches the spooling members 40 and 41 to make sure that the net 21 is laid on the drum 30 in a very smooth and generally cylindrical manner, rather than bunching or mounding or bulging at any one location. By use of the controls 50 through 53, the net 21 is brought on board, all by power without any hand labor being involved, the only hand labor being that of the man moving the controls 50 through 53. The stowing continues until the net is substantially fully wound on the drum, after the fish have all been harvested whether by the means shown in my copending application, Ser. No. 867,536 filed Oct. 20, 1969 or by brailing or other means, and the remainder of the net wound on the drum 30, still by power. The net 21 may then be returned to its position shown in FIG. 1, whence it may be laid again at once.

The invention makes the operation rapid and efficient and enables the ship 15 to accomplish much more fishing in a single day than was heretofore possible with hand-stowing methods or with the relatively crude machine methods heretofore in use.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A net-laying and stowing system for oceangoing vessels having a hull with a deck and a stern, comprising:
    a smooth surface at said stern over which the net may be dropped into the water.
    a turntable on the deck near the stern,
    a stowing and laying drum around which the net is wound, said drum having a pair of end flanges, means on said turntable supporting said drum for rotation, two spooling means mounted on said turntable for individually engaging each edge of the net, each said means being movable across the net from one of the two edges, for spooling the net onto the drum so that weights, floats, and other net attachments can be accommodated, so that the net is spooled around the drum in a cylinder rather than bulging at each end, and means for individually controlling each of said spooling means.

2. A net-laying and stowing system for oceangoing vessels having a hull with a deck and a stern, comprising:

a smooth surface at said stern over which the net may be dropped into the water.

a turntable on the deck near the stern, enabling motion of 180° from the stern, toward the portside and toward the bow and back again, a stowing and laying drum around which the net is wound, said drum having a pair of end flanges, means on said turntable supporting said drum for rotation, two spooling means mounted on said turntable for individually engaging each edge of the net, each said means being movable across approximately half the net from one of the two edges, for spooling the net onto the drum so that weights, floats, and other net attachments can be accommodated so that the net is spooled around the drum in a cylinder rather than bulging at each end, and means for individually controlling each of said spooling means.